United States Patent [19]

Motoda

[11] Patent Number: 4,687,403
[45] Date of Patent: Aug. 18, 1987

[54] ARTICLE DELIVERY APPARATUS

[75] Inventor: Kenro Motoda, Tokyo, Japan

[73] Assignee: Motoda Electronics Co., Ltd., Tokyo, Japan

[21] Appl. No.: 652,003

[22] Filed: Sep. 19, 1984

[30] Foreign Application Priority Data

Oct. 18, 1983 [JP] Japan .................. 58-193438
Feb. 29, 1984 [JP] Japan .................. 59-38179

[51] Int. Cl.⁴ .............................. B65G 60/00
[52] U.S. Cl. .................... 414/32; 414/225; 414/750
[58] Field of Search .......... 414/222, 225, 331, 750, 414/751, 752, 753, 32, 417, 37

[56] References Cited

U.S. PATENT DOCUMENTS 3,895,477 7/1975 Yamashita ............. 414/750 X
4,541,762 9/1985 Tischler et al. .......... 414/32
4,588,341 5/1986 Motoda ................... 414/32

FOREIGN PATENT DOCUMENTS

161730 12/1980 Japan .................... 414/37
59-22821 2/1984 Japan .................... 414/32

Primary Examiner—Robert J. Spar
Assistant Examiner—Janice Krizek
Attorney, Agent, or Firm—Lackenbach Siegel Marzullo & Aronson

[57] ABSTRACT

An article delivery apparatus carries out article delivery in a factory and so on through trays comprising, a main body having a tray supply portion for loading a tray stack including a plurality of trays stacked one upon another and an article delivery portion for positioning the tray transferred from the tray supply portion so as to allow an article delivery operation, a transfer device provided in association with the tray supply portion and the article delivery portion for feeding the tray from the tray supply portion to the article delivery portion and returning the tray after completion of the article delivery operation to a lower portion of the tray supply portion, and a lift provided in the vicinity of the tray supply portion for feeding the tray of the tray stack to the transfer device and receiving the tray after completion of the article delivery operation returned to the lower portion of the tray supply portion.

7 Claims, 17 Drawing Figures

ARTICLE DELIVERY APPARATUS

BACKGROUND OF THE INVENTION

1. Field of the Invention

This invention relates to an article delivery apparatus which carries out article delivery through a tray and is capable of carrying out article delivery operations effectively between the tray which holds articles such as products, intermediate products, parts etc. thereon and a working station in a factory etc.

2. Description of the Prior Art

In the conventional manufacturing line or processing line of a factory, tedious handling operations such as delivery, loading or unloading of parts, intermediate products or finished products are repeatedly carried out. These operations are troublesome and require much time.

In this connection, it is to be noted that industrial robots have been introduced into various manufacturing lines or processing lines, but that to utilize such industrial robots effectively in small-lot manufacturing of articles of different kinds, peripheral equipment with considerable flexibility is required. However, there has not yet been provided such flexible peripheral equipment which can effectively operate with the industrial robot. Heretofore, belt conveyors are used to deliver articles to the robots or receive articles from the robots. Such belt conveyors require rather large scale installations and they are not suitable for making rapid and precise delivery of a large amount of articles in association with the robots.

SUMMARY OF THE INVENTION

It is a first consideration of the present invention to provide an article delivery apparatus which is capable of carrying out the delivery of great quantities of articles to or from robots rapidly and accurately.

It is a second consideration of the present invention to provide an article delivery apparatus which is suitable for delivery of articles of various types in small lots.

It is a third consideration of the present invention to provide an article delivery apparatus which is capable of accurately and rapidly carrying out article delivery between working stations of various manufacturing lines or processing lines.

It is a further consideration of the present invention to provide an article delivery apparatus which is capable of handling articles properly.

It is a still further consideration of the present invention to provide an article delivery apparatus which can be provided in a compact form suitable for peripheral equipment and can be installed easily at a reasonable cost.

The article delivery apparatus of the present invention delivers articles through a tray, in which a stack of trays is loaded within the body of the apparatus and the trays are sequentially fed to an article delivering portion so as to attain an article delivery operation rapidly and accurately in relation with an individual robot.

DESCRIPTION OF THE PREFERRED EMBODIMENT

Figures 1, 2:
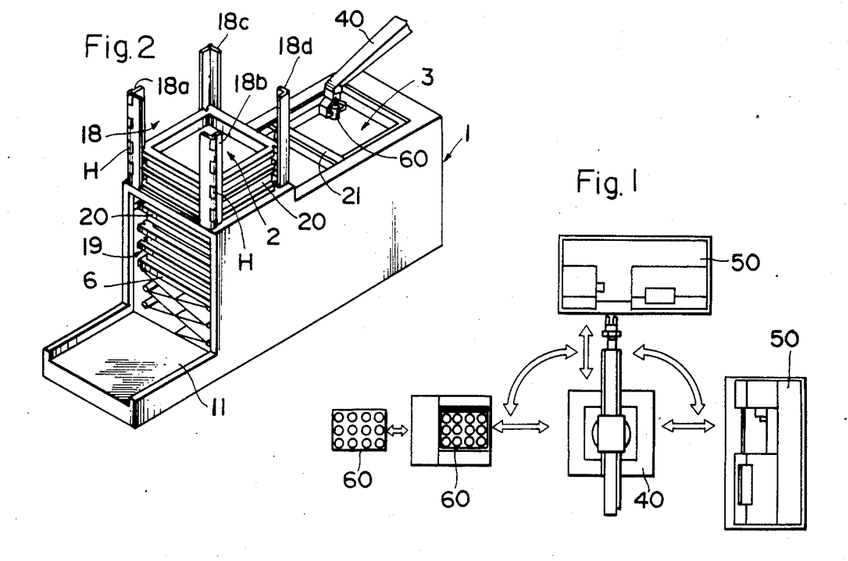
FIG. 1 is a schematic plan view of an article delivery apparatus of the present invention.
FIG. 2 is a perspective view of one preferred form of an article delivery apparatus according to the present invention.

The article delivery apparatus of the present invention is used, for example, in a manner as illustrated in FIG. 1. Stated more specifically, a working robot 40 is positioned in the vicinity of a machine 50 such as a manufacturing machine or processing machine and the article delivery apparatus of the present invention is placed in association with the working robot 40. In the example as illustrated, articles 60 are sequentially supplied by a main body of the article delivery apparatus to an article delivery position so that the working robot 40 may take up the articles 60 sequentially to feed them to the machine 50. Alternatively, in case the articles are conveyed by a belt conveyor or the like on the production line, the working robot 40 may take the articles 60 on the conveyor into the main body of the apparatus. Thus, the article delivery apparatus of the present invention can be used both for the delivery of articles and receipt of articles.

One preferred embodiment of the present invention will now be described with reference to FIGS. 2 to 7. In this embodiment, an article delivery apparatus is located at a given working station. A tray supply portion 2 storing a stack 20 of trays and an article delivery portion 3 corresponding to the tray supply portion 2 are provided within a main body 1 of the apparatus. Also within the main body 1 are a tray transfer mechanism 5 for feeding and returning trays 21 in the tray supply portion 2 in association with the tray supply portion 2 and the article delivery portion 3 and a lift mechanism 6 which is located under the tray supply portion 2 for receiving the stack 20 of trays so as to associate the trays 21 with the transfer mechanism 5.

Figure 3:
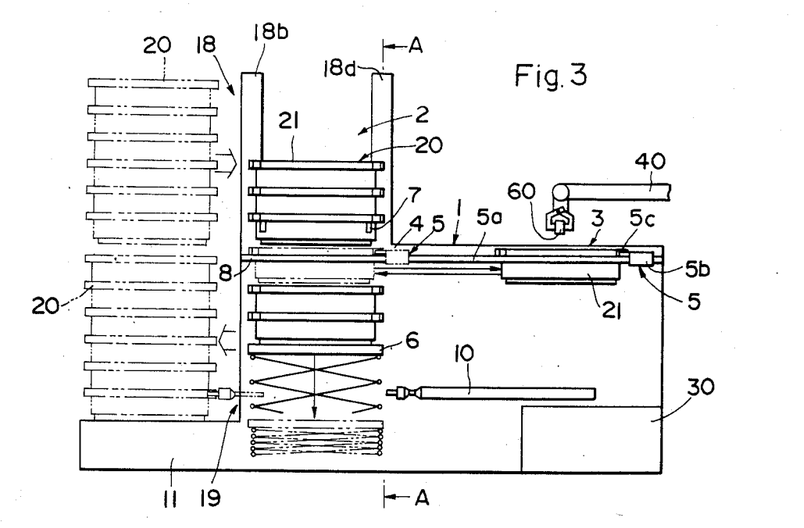
FIG. 3 is a side view of the apparatus showing its inner side.
Figure 4:
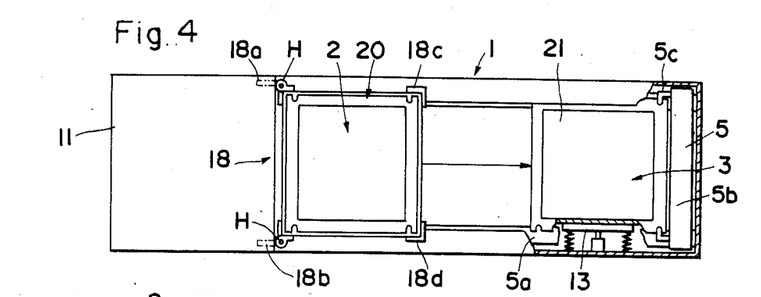
FIG. 4 is a plan view of the apparatus shown in FIG. 2.

The main body 1 having the tray supply portion 2 and the tray delivery portion 3 corresponding thereto is generally formed in a box-like shape.

The tray supply portion 2 is provided at a forward portion of the main body 1 in the embodiment as illustrated and has a loading portion 18 for loading the stack 20 of trays at an upper forward portion of the main body 1 and an unloading portion 19 for unloading the stack 20 of trays at a lower forward portion of the main body 1. In this connection, it is to be noted that the tray stack 20 is formed of a plurality of trays 21 stacked one upon another. In the embodiment as illustrated, the tray supply portion 2 is provided in the form of a parallelepiped space for containing the stack 20 therein which extends from the upper portion of the main body 1 to the inner portion of the body 1. An upper part of the space is formed from four frame members 18a, 18b, 18c, 18d which are disposed at the corners. And two of said frame members 18a, 18b are made openable to form the loading portion 18 to load the tray stack 20 into the tray supply portion 2 therefrom. More specifically, the forward frame members 18a, 18b are made openable by hinge members H. The forward frame members 18a, 18b are opened when the stack 20 is loaded and closed after the stack 20 has been loaded.

The lift mechanism 6 is provided below the tray supply portion 2 so as to move up and down when the tray stack 20 loaded within the loading portion 18 is placed on the lift mechanism 6. The second tray 21 from the bottom of the stack 20 on the lift mechanism 6 is supported by engaging members 7 provided within the tray supply portion 2 and thus, the trays 21 above the said second tray 21 are released from the bottom tray 21 when the lift mechanism 6 is lowered. Then the upper trays 21 including the said second tray 21 are supported by the engaging members 7 and the bottom tray 21 is placed on the lift mechanism 6 and supported by engaging members 8 at the lowermost position in the tray supply portion 2. The bottom tray 21 is released from the lift mechanism 6 when the lift mechanism 6 is further lowered.

Figures 5, 6, 7, 8:
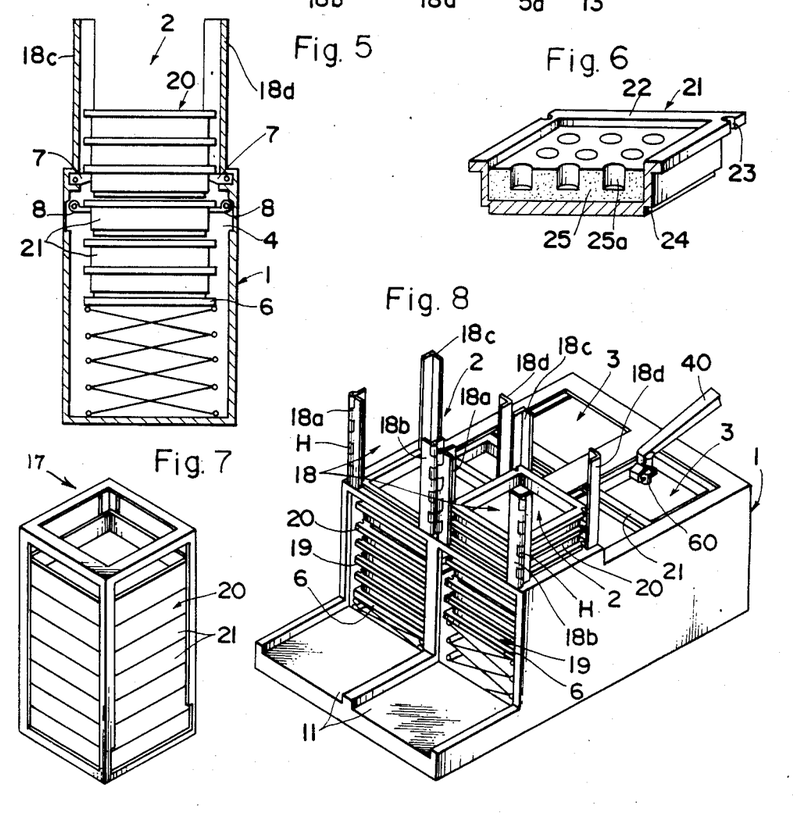
FIG. 5 is a sectional view taken along line A—A in FIG. 3.
FIG. 6 is a perspective view of a tray usable in the present invention.
FIG. 7 is a perspective view of another form of a tray stack employable in the present invention.
FIG. 8 is a perspective view of another form of an article delivery apparatus according to the present invention.

The engaging members 7 are each formed of a latch member rotatably pivoted within the tray supply portion 2 as illustrated in FIG. 5 and a flange 22 of the tray 21 is supported by the latch members. Alternatively, rod members may be employed in combination with small cylinders so as to be projected by the cylinders to support the tray 21. The engaging members 7 may be any other suitable mechanism.

An opening 4 is provided at a rear portion of tray supply portion 2 behind the tray 21 which is supported by the engaging members 8 at the lowermost portion of the tray supply portion 2.

The engaging members 8 are provided oppositely tray supply portion 2 under the engaging members 7 and are mounted rotatably so as to be projected to engage with the flange 22 of the tray 21 to support it. When the plate/members are retracted, the up and down passage of the tray stack 20 is cleared and the tray on the engaging members 8 is again placed on the lift mechanism 6. The engaging members 8 may alternatively be formed of rods and small cylinders.

The tray 21 supported by the engaging members 8 is fed horizontally to the article delivery portion 3 through the opening 4 by the transfer mechanism 5. The transfer mechanism 5 is provided in association with the article delivery portion 3 and comprises a pair of parallel guide members 5a extending from the tray supply portion 2 and the article delivery portion 3 and a slider member 5b with hook members 5c. The slider member 5b is slidable on the guide members 5a. The transfer mechanism 5 reciprocates the tray 21 between the tray supply portion 2 and the article delivery portion 3 by holding the tray 21 on the engaging members 8 by hook members 5c and moving the slider 5b on the guide members 5a. The hook members 5c may have functions of holding the tray 21 on the lift mechanism 6 therebetween and of releasing the tray 21 from another tray adjacent thereto by raising slightly the former tray. The slider member 5b may be driven by a motor to run on the guide members 5a or tractively driven by a chain or a wire. The slider member 5b may alternatively be formed of a rod member with a suction pad connected at the tip end thereof so as to be applied to the tray 21 and a cylinder to drive the rod member.

The article delivery portion 3 is provided at an upper portion of the main body 1. When the tray 21 is transferred to and set in the article delivery portion 3 as illustrated in FIG. 3, the working robot 40 delivers articles to the tray 21 or it receives the articles from the tray 21. The tray 21 in the article delivery portion 3 is positioned with respect to the transfer direction by the transfer mechanism 5 and positioned with respect to the transverse direction by a positioning means 13 which is provided at the side portion of the article delivery portion 3 to urge the tray 21 located therein. Thus, the article delivery operation by the working robot 40 is effected accurately. At the working station, the article delivery operation may of course be effected manually without using a working robot.

The tray 21 is in the form of a flat container opened at the upper portion thereof as illustrated in FIG. 6. The tray 21 has the flange 22 at the upper portion thereof, notches 23, 23 at the corner portions of the flange 22 and stepped portion 24 at the lower side face thereof so as to be engaged with the adjacent lower tray 21 when the trays are stacked to ensure the alignment of the trays and the formation of a rigid stack 20. An article receptacle member 25 having article holding portions 25a formed of expanded plastics such as expanded polystyrene and conformed with the shape of the article 60 may be placed in the tray 21. In this case, the articles may be located properly in the article holding portions to make the automatic article delivery operation of the working robot 40 easier. The article receptacle member 25 and the tray 21 may be made integrally with each other. The configuration of the tray 21 is not limited to the configuration as illustrated in FIG. 6 and it may be selected according to necessity. Therefore, commonly available palletes or plastic containers may be employed.

The tray 21 after completion of the article delivery operation at the article delivery portion 3 is returned to the tray supply portion 2 and placed on the lift mechanism 6. Thereafter, the remaining trays 21 on the engaging members 7 are sequentially supplied to the article delivery portion 3, subjected to the delivery operation by the working robot 40 and laid on the trays 21 one after another. When all the trays 21 are placed on the lift mechanism 6, the tray stack 20 is discharged from the unloading portion 19 by the discharging mechanism 10 through a guide 11. The tray stack 20 discharged from the main body 1 is conveyed to the succeeding working station by a truck or a conveyor.

Although the tray loading portion 18 is formed at the forward upper portion of the tray supply portion 2, it may be provided at the top of the tray supply portion 2 so as to load the tray stack 20 vertically. Alternatively, the unloading portion 19 may be used also for loading of the tray stack. In this case, the tray stack 20 is put onto the lift mechanism 6 from the outside by the discharging mechanism 10 and the trays 21 are sequentially subjected to the article delivery operation in the order from the top of the stack. The trays 21 completed with the article delivery operation are sequentially raised from the lower position of the tray supply portion 2 so as to engage with the engaging members 7. After all the trays 21 have completed the operation, the engagement by the engaging members 7 is released so as to allow the tray stack 20 to be placed on the lift mechanism 6 and discharged to the outside. The loading portion and the unloading portion are provided at the opposite ends of the main body 1 in the longitudinal direction thereof.

An extra tray 21 may be contained in the tray supply portion 2 in addition to the tray stack 20 so that the extra tray 21 may be fed to the article delivery portion 3 when the trays after completion with the delivery operation are replaced with fresh ones. In this case, a time loss due to the replacement of the tray stack can be reduced considerably.

Alternatively, a plurality of main bodies 1 may be installed adjacent to each other so that the working robot 40 may continuously carry out the article delivery operations for any one of the main bodies which is ready for the article delivery operation while another main body is effecting a replacement operation.

The transfer mechanism 5, the lift mechanism 6, the engaging members 7, the engaging members 8 and the discharging mechanism 10 are operated systematically by the instructions from a control unit 30.

The operation of the present embodiment will now be described.

The tray stack 20 is first loaded into the tray supply portion 2 through the loading portion 18 and one tray of the stack 20 is supported by the engaging means 8 while support of the remaining trays 21 is by the engaging members 7. The tray 21 supported on the engaging members 8 is transferred to the article delivery portion 3 and the working robot 40 carries out article delivery operations with respect to the articles on the tray 21 located in the article delivery portion 3. The tray 21 after completion of the operation is returned onto the lift machanism 6 by the engaging members 8. When a predetermined number of trays 21 are placed on the lift mechanism 6, the stack 20 is discharged from the tray supply portion 2 by the discharge mechanism 10. In the meantime, a fresh stack 20 is loaded into the tray supply portion 2 and the same operation as described above is repeated.

The stack 20 of trays may include a frame 17 as illustrated in FIG. 7. The tray stack 20 may be loaded into the tray supply portion 2 together with the frame 17. In this case, the lift mechanism 6 is adapted to enter the frame 17 and move the tray stack 20 up and down.

As described above, since a plurality of trays are contained within the main body in the form of a stack and the trays are sequentially supplied to and retracted from the article delivery portion, an automatic system for supplying and discharging to and from the delivery portion can be provided by a simple structure. Furthermore, since the tray supply portion and the article delivery portion are provided within the main body and operationally connected with each other by the transfer mechanism, the positioning of the trays can be effected accurately by the transfer mechanism so as to enable the article delivery operation to be carried out accurately.

FIG. 8 illustrates a second preferred embodiment of the present invention in which two sets of article delivery mechanisms similar to that of the first embodiment, each containing a tray supply portion 2, an article delivery portion 3, a tray transfer mechanism 5 and a lift mechanism 6 are provided within a main body 1 adjacently to each other.

In this embodiment, when the article delivery operation has been completed with respect to one of the article delivery portions 3 and the trays 21 after completion of the operation are being replaced with fresh trays 21, another article delivery portion 3 is in a position ready for article delivery by the working robot 40. Thus, the working robot 40 carries out the delivery operation with respect to the article delivery portions 3, 3 alternatingly so that the operation can be effected without interruption.

FIGS. 9 to 12 illustrate a third embodiment of the present invention. In this embodiment, a tray supply portion 2 for containing a tray stack 20 therein and a plurality of article delivery portions 3A, 3B associated with the tray supply portion 2 are provided within a main body 1. Tray transfer mechanisms 5A, 5B are provided in the article delivery portions 3A, 3B, respectively for transferring the trays from and to the tray supply portion 2 and a lift mechanism 6 for receiving the tray stack 20 thereon so as to feed the trays 21 to the transfer mechanism 5A and 5B.

Figure 9:
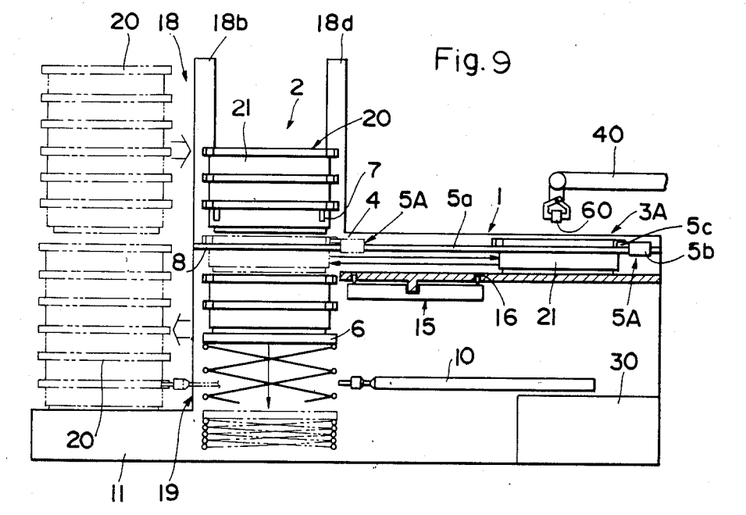
FIG. 9 is a side view of a third form of an article delivery apparatus according to the present invention showing its inner side.

The tray supply portion 2 of this embodiment is identical to that of the first embodiment and the description thereof is omitted here.

Figure 10:
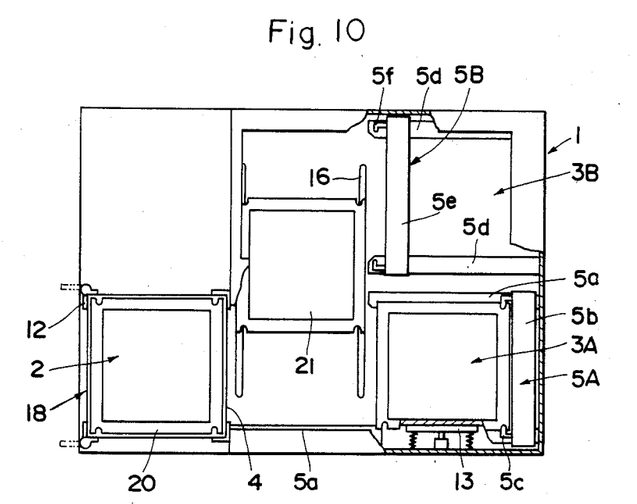
FIG. 10 is a plan view of the apparatus shown in FIG. 9.

The two transfer mechanisms 5A, 5B provided corresponding to the article delivery portions 3A, 3B, respectively comprise parallel guide members 5a, 5d extending from the tray supply portion 2 and the article delivery portion 3 and slider members 5b, 5e having hook members 5c, 5f, respectively and adapted to slide on the parallel guide members 5a, 5d. The transfer mechanism 5A reciprocates the tray 21 supported by engaging members 8 between the tray supply portion 2 and the article delivery portion 3A in such a manner that the tray is held between the hook members 5c and the slider 5b is moved along the parallel guide member 5a.

The other transfer mechanism 5B is disposed in parallel with the transfer mechanism 5A as illustrated in FIG. 10 and includes the parallel guide members 5d, the slider member 5e and the hook members 5f. However, the parallel guide members 5d are not connected directly to the tray supply portion 2 but connected thereto through an intermediate transfer means 15 connected to the intermediate portion of the parallel guide members 5a. Therefore, the transfer of the tray 21 to the article delivery portion 3B is carried out by the transfer mechanism 5A, the intermediate transfer means 15, and the transfer mechanism 5B. The intermediate transfer means 15 is so constructed as illustrated in FIG. 9 for transferring the tray 21 transversely under a guide groove 16 for transferring the tray 21.

The constructions and functions of the hook members 5c, 5f are similar to those of the hook members of the first embodiment.

The article delivery operation by the working robot 40 with respect to the two article delivery portions 3A, 3B are carried out in a manner similar to that of the second embodiment. The positioning of the trays 21 in the article delivery portions 3A and 3B is also effected similarly to the foregoing embodiments.

The trays 21 after completion of the delivery operation are returned by the transfer mechanism 5A, or the transfer mechanism 5B and the intermediate transfer means 15 and placed on the lift mechanism 6. The stack of trays on the lift mechanism 6 is discharged in a manner similar to that of the first embodiment.

In the present embodiment, when the trays 21 are being replaced with fresh ones after completion of the article delivery operation at one of the article delivery portions 3A, another article delivery portion 3B may be in a position ready for continuous operation by the working robot 40. Thus, the delivery operation by the working robot 40 may be carried out without interruption.

Figure 11:
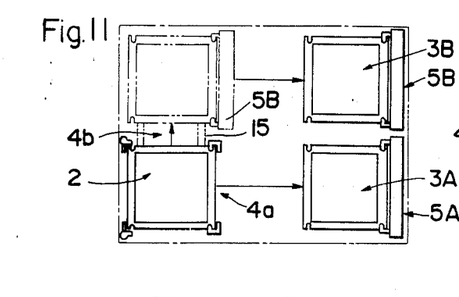
FIGS. 11 and 12 are plan views of modifications of the apparatus of FIG. 9.
Figure 12:
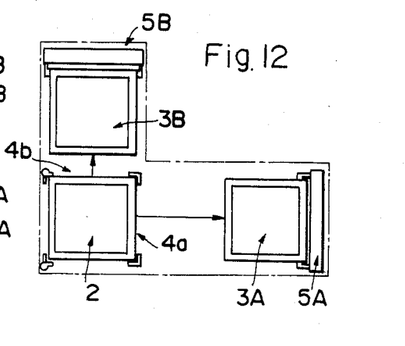

FIGS. 11 and 12 illustrate modifications of the present embodiment. In the modification of FIG. 11, the tray supply portion 2 has two openings 4a, 4b. Through the opening 4a, the tray is transferred by the transfer mechanism 5A similarly to the embodiment of FIG. 10, and through the other opening 4b, the tray 21 is transferred by the intermediate transfer means 15 and the transfer mechanism 5B. Thus, the tray supply to the article delivery portions 3A, 3B can always be made. In the modification of FIG. 12, the two transfer mechanisms 5A, 5B directly transfer the trays 21 through openings 4a and 4b, respectively.

Figure 13:
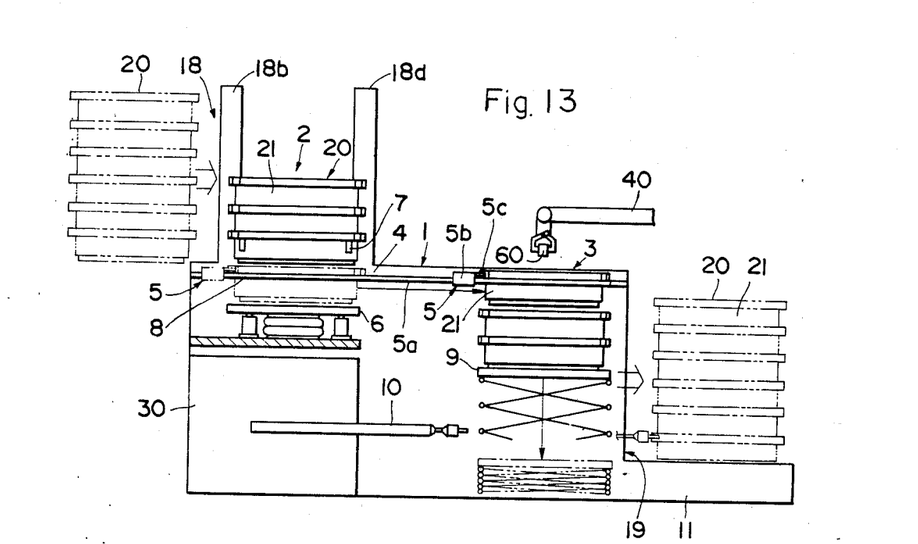
FIG. 13 is a side view of a fourth form of an article delivery apparatus according to the present invention showing its inner side.

FIG. 13 illustrates a further embodiment of the present invention wherein a tray supply portion 2 for containing a tray stack 20 and an article delivery portion 3 corresponding to the tray supply portion 2 are provided within a main body 1. At the article delivery portion 3, a transfer mechanism 5 for transferring the trays 21 sequentially is provided and at the tray supply portion 2, a feeding lift mechanism 6 for mounting the tray stack 20 thereon and placing the trays 21 in association with the transfer mechanism 5. At the article delivery portion 3, a receiving lift mechanism 9 is also provided for receiving the trays 21 transferred from the tray supply portion 2 thereon.

The tray supply portion 2 of the present invention is similar to those of the foregoing embodiments except for the feeding lift mechanism 6. The tray stack 20 loaded through a loading portion 18 is placed on the lift mechanism 6. The second from the bottom of the tray stack 20 on the lift mechanism 6 is supported by engaging members 7 in the tray supply portion 2 and released from the bottom tray when the lift mechanism 6 is lowered. The upper trays including the second tray from the bottom are supported by the engaging members. The bottom tray 21 is placed on the lift mechanism 6 and supported by guide members 5a and released from the lift mechanism 6 when the latter is further lowered.

The engaging members 7 are identical with those of the foregoing embodiments.

An opening 4 is formed in the tray supply portion 2 behind the tray 21 supported by the guide members 5a. The guide members 5a are provided within the tray supply portion 2 below the engaging members 7 which support the tray 21 at the flange portion thereof.

The tray 21 supported by the guide members 5a is horizontally transferred to the article delivery portion 3 through the opening 4 by the transfer mechanism 5. The transfer mechanism comprises the guide members 5a extending from the tray supply portion 2 to the article delivery portion 3 and a slider member 5b having hook members 5c and slidable on the guide members 5a. The transfer mechanism 5 transfers the tray 21 in the tray supply portion 2 to the article delivery portion 3 in such a manner that the tray 21 is held between the hook members 5c and the slider member 5b is driven to slide along the guide members 5a to engaging members 8. The hook members 5c may have a function to raise the tray 21 to release from the engagement with the adjacent tray. The slider member 5b is identical with those of the foregoing embodiments.

The engaging members 8 is provided in the article delivery portion 3 but has a similar structure to those of the engaging members 8 of the foregoing embodiments The article delivery portion 3 is provided rearward of the top portion of the main body 1 and an unloading portion 19 for unloading the tray stack 20 is provided at a lower back portion of the main body 1. As illustrated in FIG. 13, the working robot 40 delivers articles from or to the tray 21 in the article delivery portion 3. The positioning of the tray 21 in the portion 3 is attained in a similar manner to those in the foregoing embodiments.

The tray 21 after completion of the article delivery operation is put onto the lift mechanism 9 when the engaging members 8 release the flange 22 of the tray 21 and the tray supported on the guide members 5a is sequentially fed to the article delivery portion 3. Similar operations are repeated thereafter and when all the trays 21 are placed on the lift mechanism 9 after the article delivery operation, the tray stack 20 is discharged to the outside through the unloading portion 19 by a discharge means 10 through a guide 11.

The loading portion may alternatively be provided at the top portion of the tray supply portion 2 so as to load the tray stack 20 in the vertical direction. Or, the loading portion 18 may be used as an unloading portion and the unloading portion 19 may be used as a loading portion.

In the present embodiment, when the last tray 21 of the tray stack 20 is being subjected to delivery operation by the working robot 40, a fresh stack 20 is loaded into the tray supply portion 2 so as to assure continuous operation by the working robot 40.

A further embodiment of the present invention is illustrated in FIGS. 14, 15, 16 and 17 wherein a tray supply portion 2 for containing a tray stack 20 is located at the center of a main body 1 and an article delivery portion 3 is positioned at a rear end portion of the main body 1. These portions 2, 3 are similar to those of FIG. 13, and also the former portion 2 is provided with a feeding mechanism 6 and the latter portion 3 is provided with a receiving mechanism 9. And between these portions 2, 3, a transfer mechanism 5 which is similar to those of foregoing embodiments is provided.

Figure 14:
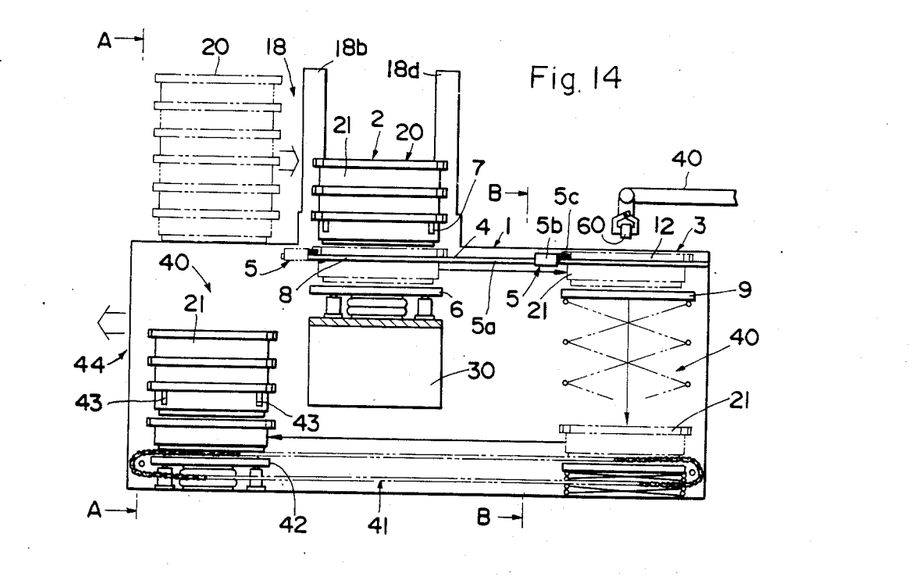
FIG. 14 is a similar vertical sectional view of a further different form of an article delivery apparatus according to the present invention showing its inner side.

At the bottom portion of the main body 1, an unloading portion 40 having a carrying out mechanism 41 and an unloading lift mechanism 42 are provided. The carrying out mechanism 41 horizontally transfers the tray 21 from the lift mechanism 9 to the unloading lift mechanism 42, namely from the rear end portion to the front end portion of the main body 1.

Figure 17:
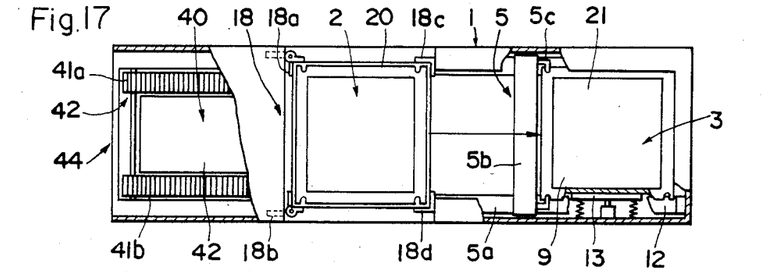
FIG. 17 is a partly cut away plan view of the apparatus of FIG. 14.

The said carrying out mechanism 41 is a chain conveyor having two rotating chain belts 41a, 41b being placed separately in parallel with each other. These belts 41a, 41b are driven by motor or other drive means, and the lift mechanism 9 and the unloading lift mechanism 42 are located between these belts 41a, 41b. Thus, in the condition the lift mechanism 9 completely descents, the tray 21 which is placed on the mechanism 9 is transferred on the rotating belts 41a, 41b. The carrying out mechanism 41 may have sliding means which is similar to said transfer mechanism 5 and also may be provided with hook means having a rod with some hook or suction cup prepared at the tip end thereof freely appearable and disappearable to pull the tray 21.

Figure 15:
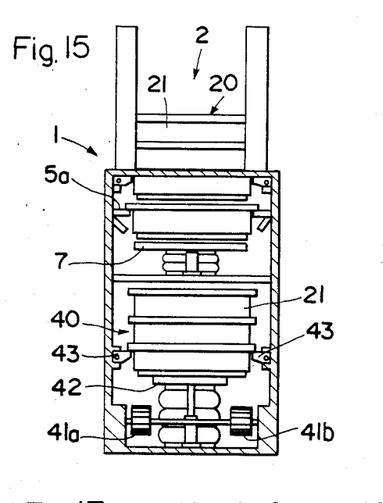
FIG. 15 is a sectional view of the apparatus taken along line A—A in FIG. 14.
Figure 16:
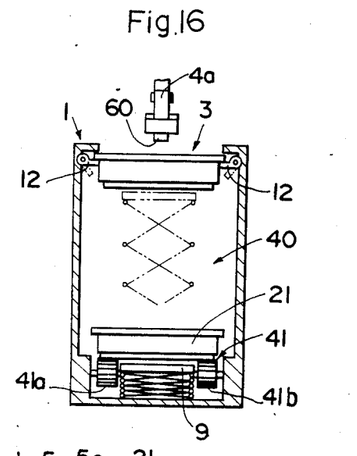
FIG. 16 is a sectional view of the apparatus taken along line B—B in FIG. 14.

The tray 21 placed on the belts 41a, 41b at the end of the conveyor is transferred to the other end horizontally. After this transfer, the tray 21 is placed on the carrying out lift mechanism 42, and is pushed up by an ascent of the lift mechanism 42. The ascended tray 21 is held with engaging members 43, 43 which are similar to said other engaging member 7, namely the engaging member 43 are each formed of a latch member rotatably pivoted as illustrated in FIGS. 15, 16. Of course, similar to said former engaging member 7, rod members may be employed in combination with small cylinders so as to be projected by said cylinders supporting the tray 21. Further, any other suitable mechanism can be employed.

Similar operations are repeated thereafter and all the trays 21 are piled up on the lowermost tray 21 which is engaged by the said members 43, 43, and the stack 20 is reformed, the stack 20 is discharged to the outside from an outlet port 44 of the main body 1. And the discharged stack 20 is conveyed to the succeeding working station by a truck or a conveyor. In this embodiment, when the last tray 21 of the tray stack 20 is subjected to delivery operation by the working robot 40, a fresh stack 20 is loaded into the tray supply portion 2 so as to assure continuous operation by the working robot 40. This embodiment performs well even if compared to the embodiment of FIG. 13, and it can perform well where two or more main bodies 1 are arranged adjoining to the robot 40.

In the above described embodiment, the front upper part of the tray supply portion 2 is formed as the loading portion 18, and a top of said portion 2 may be employed as a loading portion to load a tray 21 vertically. And a reverse operation, that is, a tray 21 is loaded into the main body 1 from the outlet port 44 and discharged from the loading portion 18. Also, an unloading portion 40 is extended toward the rear direction of the main body 1 having an outlet port 44 at the rear end thereof so as to discharge the piled up stack 20.

The invention may be embodied in other specific forms without departing from the spirit or essential characteristics thereof. The present embodiments are therefore to be considered in all respects as illustrative and not restrictive.

I claim:

1. An article delivery/receiving apparatus for delivering/receiving articles through the use of trays in a factory, comprising:
   a main body adapted to be disposed in the vicinity of a working station, and a carrier containing a stack of trays therein; and said main body including:
   a tray loading/unloading portion having a space for encasing said carrier, and said carrier containing said stack of trays which is adapted to be loaded or unloaded;
   a tray engaging neans provided in said tray loading-/unloading portion and being sequentially engageable with each lowermost tray and the next lowermost tray of the stack, whereby said lowermost tray is released from said stack of trays;
   first and second article delivery/receiving portions formed at an upper portion of said main body to allow for cooperation with a working robot, and each being disposed in juxtaposition to said tray loading/unloading portion;
   a lift means, for stepwise vertical movement of said stack of trays to permit unstacking of said stack of trays as well as separate restacking of returned trays on top of said lift means;
   first upper lateral feeding means provided in said main body for laterally shifting said lowermost tray to and from said first article delivery/receiving portion; and
   a second upper lateral feeding means provided in said main body for laterally shifting the next lowermost tray to and from said second article delivery receiving portion.

2. An article delivery/receiving apparatus as claimed in claim 1, wherein said stack of trays are stacked in the vertical direction and said trays are loadable/unloadable in said tray loading/unloading portion of said main body.

3. An article delivery/receiving apparatus as claimed in claim 1, wherein said first and second upper lateral feeding means are each arranged to shift said lowermost tray located at an uppermost position in said tray loading/unloading portion and wherein trays are returned on top of said lift means.

4. An article delivery/receiving apparatus as claimed in claim 3, further including a discharge means for discharging trays on said lift means.

5. An article delivery/receiving apparatus as claimed in claim 4, further including stepwise movement of a stack of said trays that are returned, and said discharge means being engageable with said stack of returned trays so as to further move said return trays.

6. An article delivery/receiving apparatus as claimed in claim 1, wherein said first and second upper lateral feeding means are arranged in crossing directions.

7. An article delivery/receiving apparatus for delivering/receiving articles through the use of trays in a factory, comprising:
   a main body adapted to be disposed in the vicinity of a working station, and a carrier containing a stack of trays therein; and said main body including:
   a tray loading/unloading portion having a space for encasing said carrier, and said carrier containing said stack of trays which is adapted to be loaded or unloaded;
   a tray engaging means provided in said tray loading-/unloading portion and being sequentially engageable with each lowermost tray and the next lowermost tray of the stack, whereby said lowermost tray is released from said stack of trays;
   first and second article delivery/receiving portions formed at an upper portion of said main body to allow for cooperation with a working robot;
   a lift means, for stepwise vertical movement of said stack of trays, to permit unstacking of said stack of trays as well as separate restacking of returned trays on top of said lift means;
   a first upper lateral feeding means provided in said main body for laterally shifting said lowermost tray to and from said first article delivery/receiving portion;
   a second upper lateral feeding means provided in said main body for laterally shifting the next lowermost tray to and from said second article delivery/-receiving portion, wherein said first and second upper lateral feeding means are laterally arranged; and
   a transfer means between said first and second upper lateral feeding means for shifting a tray in a crossing direction disposed orthogonally to the laterally shifting directions of said first and second upper lateral feeding means.

* * * * *